United States Patent
Krywaniuk

(10) Patent No.: US 10,038,668 B2
(45) Date of Patent: *Jul. 31, 2018

(54) COMPUTERIZED SYSTEM AND METHOD FOR HANDLING NETWORK TRAFFIC

(71) Applicant: Fortinet, Inc., Sunnyvale, CA (US)

(72) Inventor: Andrew Krywaniuk, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 831 days.

This patent is subject to a terminal disclaimer.

(21) Appl. No.: 13/948,341

(22) Filed: Jul. 23, 2013

(65) Prior Publication Data

US 2013/0305343 A1   Nov. 14, 2013

Related U.S. Application Data

(63) Continuation of application No. 13/558,822, filed on Jul. 26, 2012, now Pat. No. 8,495,200, which is a
(Continued)

(51) Int. Cl.
*G06F 15/173* (2006.01)
*H04L 29/06* (2006.01)
*G06F 15/16* (2006.01)

(52) U.S. Cl.
CPC .......... *H04L 63/02* (2013.01); *H04L 63/0227* (2013.01); *H04L 63/0272* (2013.01); *H04L 63/1425* (2013.01)

(58) Field of Classification Search
CPC .. H04L 63/0227; H04L 41/0893; H04L 63/02
(Continued)

(56) References Cited

U.S. PATENT DOCUMENTS 5,752,003 A    5/1998 Hart
5,826,029 A  * 10/1998 Gore et al. .................... 709/227
(Continued)

OTHER PUBLICATIONS

Notice of Allowance for U.S. Appl. No. 13/558,822 dated Jun. 13, 2013.
(Continued)

*Primary Examiner* — Evans Desrosiers
(74) *Attorney, Agent, or Firm* — Hamilton, DeSanctis & Cha LLP

(57) ABSTRACT

Methods and systems for processing network content associated with multiple virtual domains are provided. According to one embodiment, a service daemon process is instantiated within a firewall to handle content processing of network traffic of virtual domains by aggregating communication channels associated with the virtual domains and by applying an appropriate content processing policy for the corresponding virtual domain. A connection request is received by the firewall from a virtual domain. A child process is forked by the service daemon process to handle network traffic associated with the virtual domain. A communication channel is established between a kernel of the firewall and the service daemon process to transfer a portion of the network traffic between the service daemon process and the kernel. The child process is configured to perform content processing of the network traffic in accordance with a content processing policy associated with the virtual domain.

35 Claims, 5 Drawing Sheets

Related U.S. Application Data continuation of application No. 11/331,031, filed on Jan. 13, 2006, now Pat. No. 8,234,361.

(58) Field of Classification Search
USPC .......................................................... 709/223
See application file for complete search history.

(56) References Cited

U.S. PATENT DOCUMENTS

| | | | |
|---|---|---|---|
| 6,085,238 | A | 7/2000 | Yuasa et al. |
| 6,182,226 | B1 | 1/2001 | Reid et al. |
| 6,453,345 | B2 | 9/2002 | Trcka et al. |
| 6,633,916 | B2 | 10/2003 | Kauffman |
| 6,674,756 | B1 | 1/2004 | Rao et al. |
| 6,691,146 | B1 | 2/2004 | Armstrong et al. |
| 7,039,720 | B2 | 5/2006 | Alfieri et al. |
| 7,171,492 | B1* | 1/2007 | Borella et al. ................ 709/245 |
| 7,441,017 | B2* | 10/2008 | Watson .................. H04L 45/00 709/215 |
| 8,166,474 | B1* | 4/2012 | Delco et al. ...................... 718/1 |
| 8,234,361 | B2 | 7/2012 | Krywaniuk |
| 8,495,200 | B2 | 7/2013 | Krywaniuk |
| 2003/0110262 | A1 | 6/2003 | Hasan et al. |
| 2004/0049596 | A1 | 3/2004 | Schuehler et al. |
| 2004/0230791 | A1* | 11/2004 | Boebert .................. G06F 21/53 713/150 |
| 2004/0239973 | A1 | 12/2004 | Alkhatib et al. |
| 2005/0120138 | A1* | 6/2005 | Carmello et al. ............. 709/245 |
| 2005/0182969 | A1* | 8/2005 | Ginter et al. ................. 713/201 |
| 2007/0168547 | A1 | 7/2007 | Krywaniuk |
| 2007/0280243 | A1* | 12/2007 | Wray et al. ................... 370/392 |
| 2012/0291117 | A1 | 11/2012 | Krywaniuk |

OTHER PUBLICATIONS

Non-Final Rejection for U.S. Appl. No. 11/331,031 dated Apr. 16, 2009.
Non-Final Rejection for U.S. Appl. No. 11/331,031 dated Nov. 16, 2009.
Final Rejection for U.S. Appl. No. 11/331,031 dated Jun. 24, 2010.
Non-Final Rejection for U.S. Appl. No. 11/331,031 dated Dec. 27, 2010.
Non-Final Rejection for U.S. Appl. No. 11/331,031 dated Nov. 14, 2011.
Notice of Allowance for U.S. Appl. No. 11/331,031 dated Jun. 19, 2012.
"What is a Socket" Java Tutorial Published Oct. 31, 2004 http://web.archive.org/web/20041031034127/http:I/java.sun.com/docs/books/- tutorial/networking/sockets/definition.html.

* cited by examiner

COMPUTERIZED SYSTEM AND METHOD FOR HANDLING NETWORK TRAFFIC

CROSS-REFERENCE TO RELATED APPLICATIONS

This application is a continuation of U.S. patent application Ser. No. 13/558,822, filed Jul. 26, 2012, now U.S. Pat. No. 8,495,200, which is a continuation of U.S. patent application Ser. No. 11/331,031, filed Jan. 13, 2006, now U.S. Pat. No. 8,234,361, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2006-2013, Fortinet, Inc.

BACKGROUND

Field

Embodiments of the present invention generally relate to computer networking. In particular, embodiments of the present invention relate to achieving security and/or scalability in networking systems.

Description of the Related Art

Security threats have evolved dramatically over the last 10 years, moving from network-level, connection-oriented attacks to application-level, agent-based attacks. Conventional networking devices (firewalls) can deal with network-level packet processing; for example, conventional firewalls can stop packets that do not come from a valid source, and VPN gateways can encrypt packets on the fly, making it safe for them to traverse the Internet. But today's critical network threats, like malware, which includes spyware, viruses and worms, are embedded in the application-level contents of packet streams. Enormous processing power is needed to detect and stop these application-layer threats by extracting the content from multiple packets, reconstructing the original content, and scanning it for the telltale signs of attacks or for inappropriate content.

To address these security challenges, modern firewalls must offer application-level content processing in real time—especially for real-time applications (like Web browsing) at today's (and tomorrow's) increasing network speeds.

In a firewall, processing of network traffic is determined by a set of specific rules which collectively form a firewall policy. The firewall policy dictates how the firewall should handle specific applications network traffic such as web, email or telnet. Exemplary rules include filtering of banned words, blocking specific URLs, blocking transmission of specific file types, anti-malware scans, blocking of spam, etc. Each firewall policy generally has an associated firewall configuration profile, which configures the firewall to process the network content. The firewall policy is usually created by the network administrator and is based on the information security policy of the respective organization.

A firewall is typically implemented as a hardware/software appliance having a number of physical networking interfaces for the incoming and outgoing network traffic. Network traffic enters one of these interfaces and, after filtering and other appropriate processing, is routed to a remote host typically attached to a different physical interface. In some circumstances, firewalls are configured to also have logical interfaces, such as Virtual Local Area Network (VLAN) or Point To Point Protocol (PPP) interfaces. Such logical interfaces are purely software-implemented and do not map directly to a physical interface. For example, in VLAN configuration, PCs, servers and other network devices communicate as if they were on the same physical LAN segment, even though they may not be. The networking entities in VLAN configuration may be scattered across multiple physical networks, but to the firewall they appear as if they were all connected through a single (logical) network interface.

Large networks having multiple diverse computer systems can be subdivided into two or more disjoint virtual networks, called "virtual domains". Each such virtual domain has its own routing, network administration, access privileges as well as network security policies and configurations. Virtual domains can be used, for example, by separate organizations to share the same firewall/routing hardware, the networking interfaces of which can be segregated into disjoint routing domains, which may be administered by different users. Traffic originating from one such virtual domains can only be routed within the same virtual domain.

Unfortunately, the existing firewall systems are deficient in their ability to handle disjoint routing and configuration domains in a scalable and efficient manner. Therefore, what is needed is a scalable firewall system with an ability to manage virtual networking domains in an efficient manner.

SUMMARY

Methods and systems are described for processing network content associated with multiple virtual domains. According to one embodiment, a service daemon process is instantiated within a firewall. The service daemon process handles content processing of network traffic for multiple virtual domains coupled to the firewall by aggregating communication channels associated with the virtual domains and by applying to the network traffic an appropriate content processing policy corresponding to the virtual domain with which the network traffic is associated. A first connection request is received by the firewall involving a first virtual domain of the virtual domains. A first child process is forked by the service daemon process to handle network traffic associated with the first virtual domain. A first communication channel is established for the first virtual domain between a kernel of the firewall and the service daemon process to transfer at least a portion of the network traffic associated with the first virtual domain between the service daemon process and the kernel. The first child process is configured to perform content processing in accordance with a first content processing policy of the first virtual domain. The first child process performs content processing of the network traffic associated with the first virtual domain based on the first content processing policy.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Methods and systems are described for processing network content associated with multiple virtual domains. In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The inventor recognized that it would have been advantageous to provide a mechanism whereby network content for multiple virtual domains is managed in a scalable and efficient manner. Specifically, an embodiment of the inventive technique can simultaneously process network content associated with multiple virtual domains.

Figure 1:
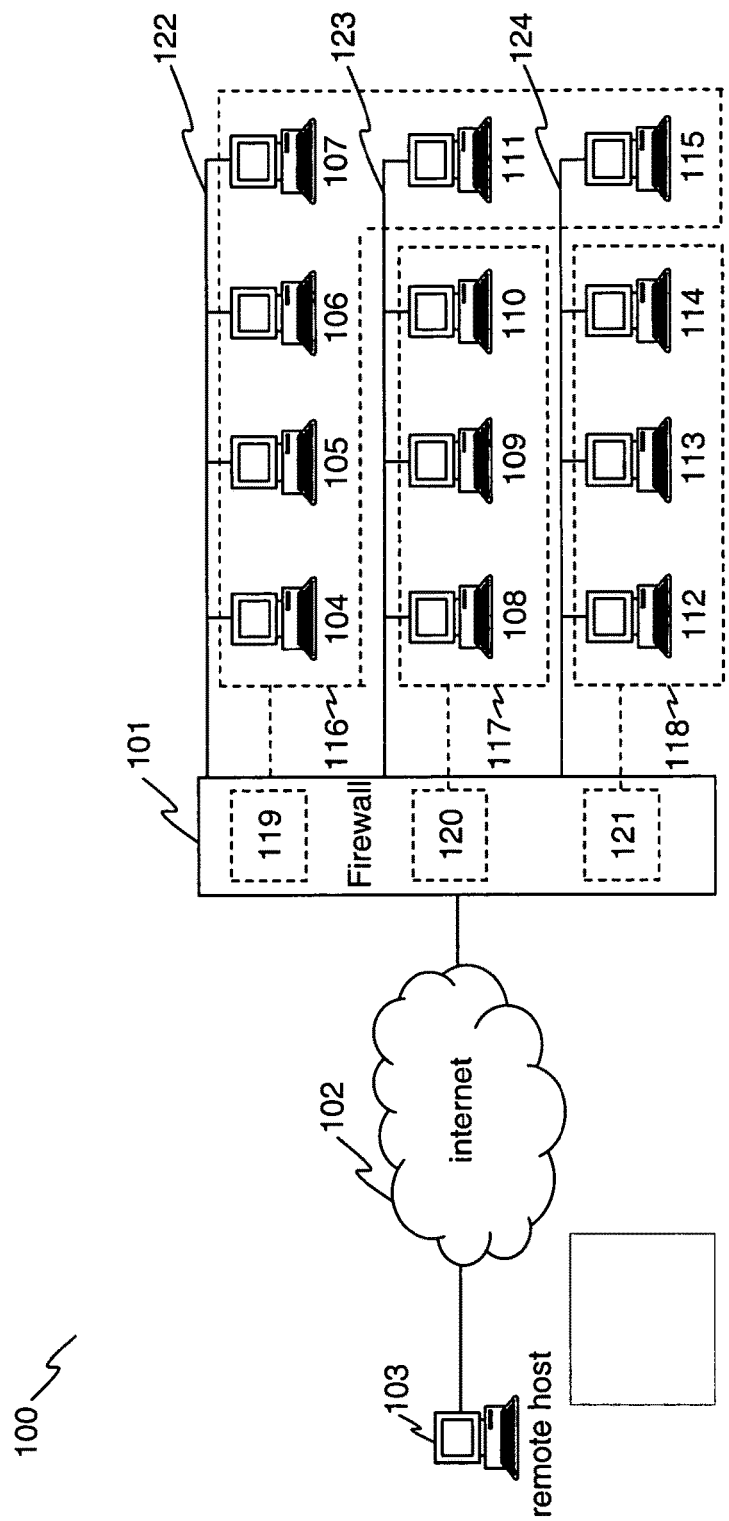
FIG. 1 depicts a conceptual block-diagram of a virtual local area network (VLAN) configuration.

FIG. 1 shows an exemplary VLAN network configuration 100. With reference to FIG. 1, physical local area networks (LAN) 122, 123 and 124 are carried by the physical interfaces of the firewall appliance 101. The physical LANs 122-124 include local network entities 104-115 connected to the respective physical network interfaces of the firewall 101. The local network entities may include PCs, network storage devices, etc. The local network entities 104-115 are grouped into three VLANs 116, 117 and 118, which are associated in the firewall 101 with logical interfaces 119, 120 and 121, respectively. The firewall 101 is coupled to the Internet 102 via a different physical interface 125. Network content transferred between a remote host 103 on the Internet 102 and any of the local entities 104-115 is processed by the firewall 101 in accordance with the firewall policy in effect. Such processing may include anti-malware scanning and/or content filtering.

Figure 2:
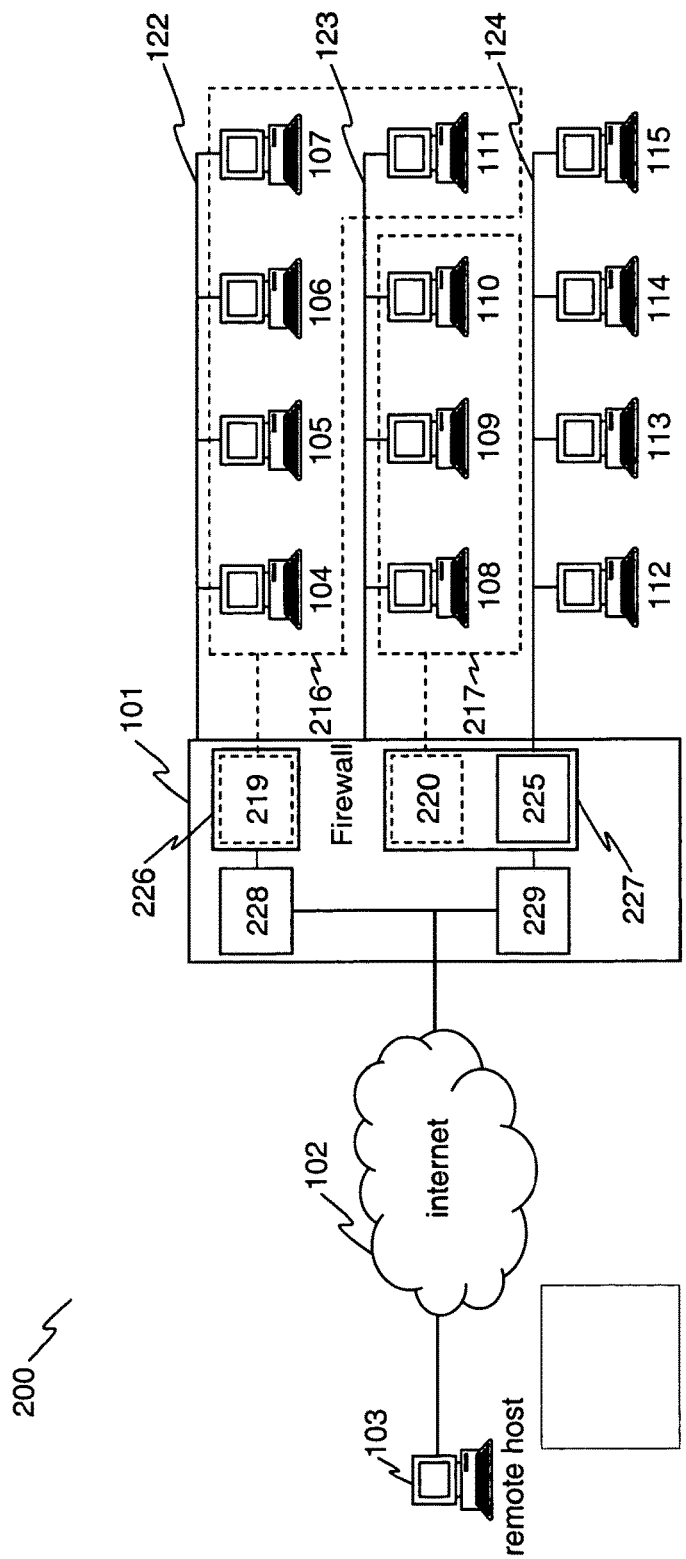
FIG. 2 depicts a conceptual block-diagram of a virtual domain configuration.

FIG. 2 illustrates an exemplary network configuration 200, with multiple virtual domains. Specifically, the local network entities 104-111 located on physical networks 122 and 123 are grouped into two VLANs 216 and 217, as described above. The VLANs 216 and 217 are associated in the firewall 101 with logical interfaces 219 and 220, respectively. Local network entities 112-115 are located on the physical network 124, which associated with firewall's physical interface 225. Logical interfaces 219 and 220 as well as physical interface 225 (and all the associated network entities) are grouped into two disjoint networks or virtual domains 226 and 227. Network traffic originating within each of these virtual domains can only be routed within the same virtual domain. The network content transmitted between the remote host 103 on the Internet 102 and the entities within the virtual domains 226 and 227 is processed by the firewall 101. Each of the virtual domains 226 and 227 may have different content processing policies (not shown) in effect for handling network content associated with the respective virtual domain. Virtual domains 226 and 227 have disjoint routing, including the routing to the Internet. Therefore additional routers (or logical interfaces) 228 and 229 are provided to segregate the traffic between each virtual domain and the Internet. In addition, the remote host 103 would normally be allowed to connect to one of the virtual domains 226 and 227, but not both.

Figure 3:
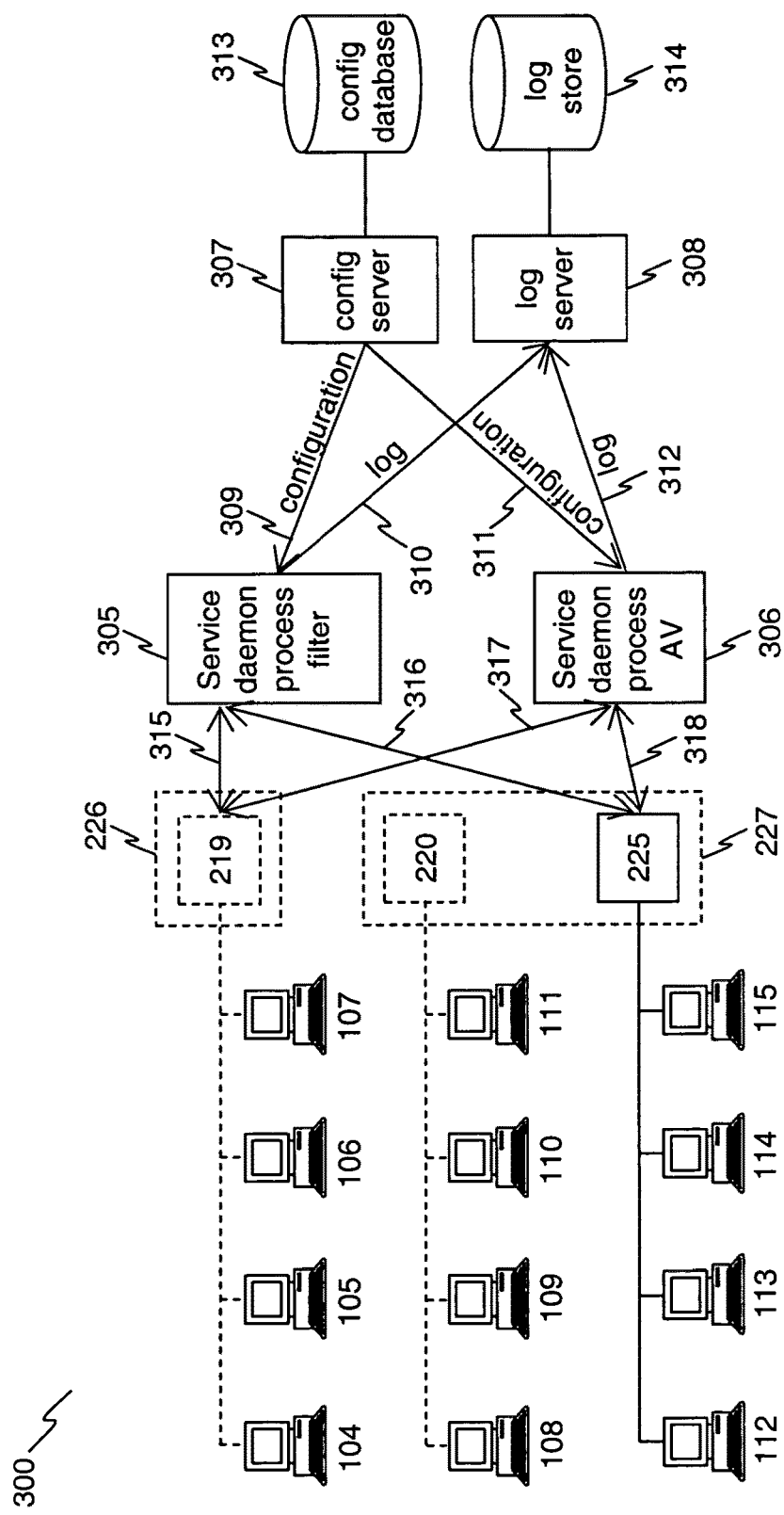
FIG. 3 illustrates a conceptual block-diagram of a computerized system for processing network content in a virtual domain environment in accordance with an embodiment of the present invention.

FIG. 3 illustrates a conceptual block-diagram of a computerized system for processing network content in a virtual domain environment in accordance with an embodiment of the present invention. With reference to FIG. 3, the shown embodiment of the inventive firewall system 300 comprises logical interfaces 219 and 220 and physical interface 225. Logical interface 220 and physical interface 225 together form a virtual domain 227. Virtual domain 226 is associated with the single logical interface 219. Local network entities 104-115 are grouped into virtual domains 226 and 227 in accordance with grouping of their respective interfaces.

The network traffic transmitted by the firewall is processed by firewall daemon processes 305 and 306. Specifically, in the shown embodiment service daemon process 305 performs content filtering for virtual domains 226 and 227, while service daemon 305 handles anti-malware scanning of the content. Service processes 305 and 306 communicate with interfaces 219, 220 and 225 through separate communication channels and specifically sockets 315-318. In an embodiment of the inventive system, each of these sockets has its own receive buffer such that packets from one virtual domain do not overflow the buffer corresponding to another virtual domain. Therefore, overflow of a buffer corresponding to one particular domain would not affect the traffic in other virtual domains.

In an embodiment of the invention shown in FIG. 3, the daemon processes 305 and 306 aggregate sockets from multiple virtual domains 226 and 227, thereby reducing the per-domain overhead associated with executing the daemon processes 305 and 306. In this configuration, when connections from multiple virtual domains are aggregated in the same daemon processes, the daemons 305 and 306 need to be aware of the identity of the virtual domain for which traffic is being processed. In one embodiment of the invention, this is accomplished by examining attributes of the associated socket, and specifically socket identifier (socket_id). Because in the configuration shown in FIG. 3, the virtual domain is uniquely identified by the logical or physical interface on the other side of the connection, the virtual domain identification information can be successfully derived from the socket_id resource of the respective socket.

Figure 4:
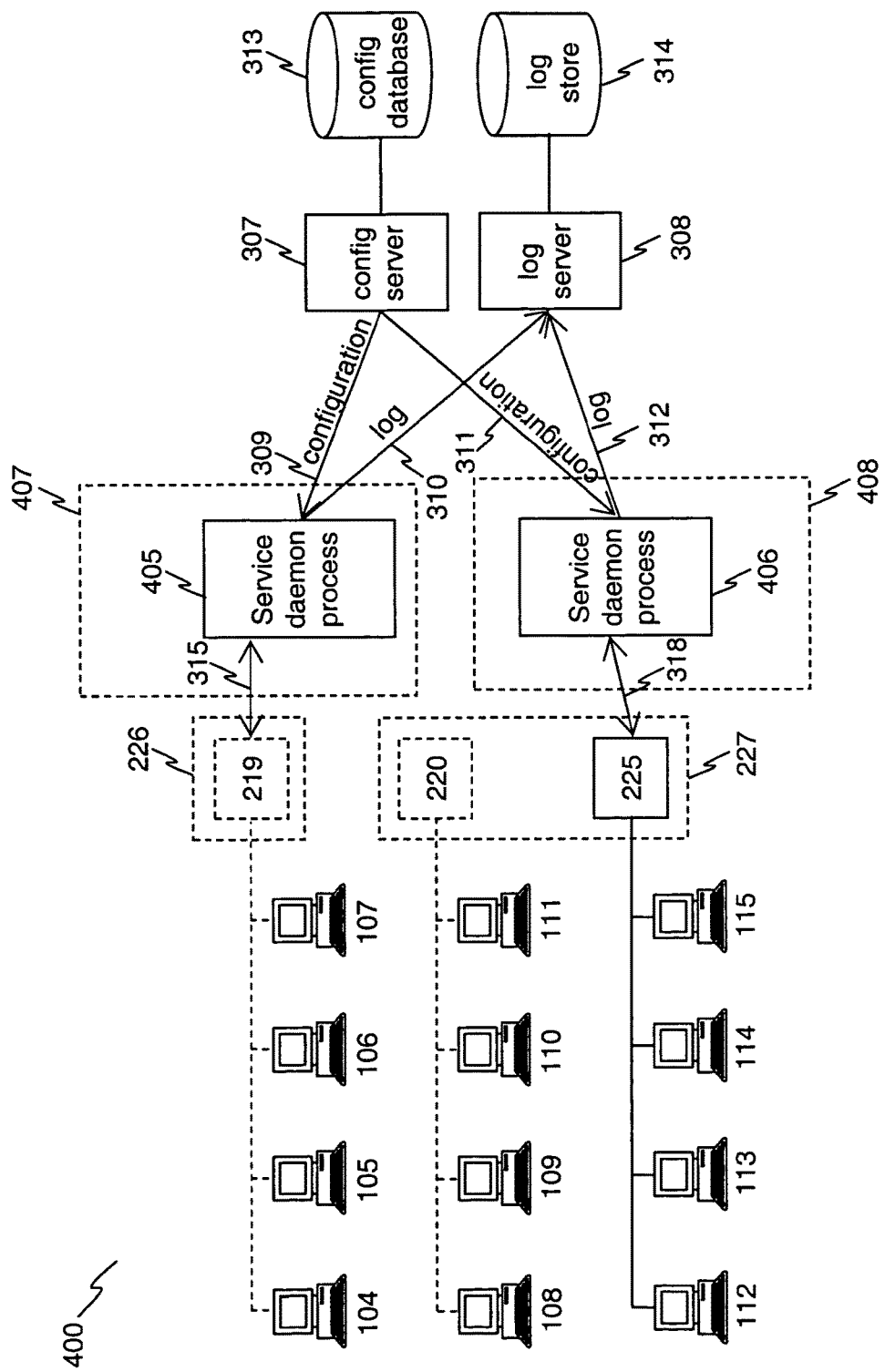
FIG. 4 illustrates a conceptual block-diagram of a computerized system for processing network content in a virtual domain environment in accordance with an alternative embodiment of the present invention.

FIG. 4 illustrates a conceptual block-diagram of a computerized system for processing network content in a virtual domain environment in accordance with an alternative embodiment of the present invention. FIG. 4 illustrates an alternative embodiment 400 of the invention, wherein multiple daemon processes 405 and 406 are used to distribute the task of processing network content from different virtual domains across multiple available CPU resources 407 and 408, thus providing performance benefits associated with more even load balancing. The embodiment shown in FIG. 4 may include a second set of daemons (not shown) for handling a different aspect of content processing. Alternatively, all aspects of content handling may be performed with the shown daemon processes 405 and 406.

Additionally, aggregation of services for multiple virtual domains within a single daemon process may require it to frequently access the domain state as well as other configuration information. To this end, the embodiments of the inventive system shown in FIGS. 3 and 4 include a configuration management server 307, which provides centralized configuration information, management and update notifications for multiple virtual domains. The configuration server 307 manages configuration for all virtual domains simultaneously and provides application programming interface (API) to answer configuration information queries from any of the daemon applications 305 and 306 on the systems 300 and 400.

In the shown embodiment of the invention, the configuration management server 307 references an associated configuration information database 313 storing information on configuration of other modules in the system 300, parameters global to the system 300, which are common across multiple virtual domains, as well as information on configuration of each separate virtual domain 226 and 227. The domain configuration information stored in the database 313 may include the specifics of the content processing policy for that virtual domain. The database 313 may be implemented as an actual database, either local or remote, or, alternatively, it may be implemented as a configuration file or a series of such files. The configuration server 307 may also provide a series of APIs for managing the configuration data stored in the associated configuration database 313.

In most cases, the aforementioned configuration database 313 can only be modified through a series of configuration server APIs that provide limited access to the users with reference to their configured permissions. These permissions may be designed to be sufficiently granular. For example, they may be allocated on a per-virtual domain basis. The configuration management server 307 ensures that an administrator for one virtual domain cannot change parameters that affect other disjoint virtual domains. In one embodiment, the internal state of the configuration server 307 is organized in an optimized format that does not store the data for each virtual domain separately. However, the configuration data would still be presented on a per-virtual domain basis at the API level.

Because different administrators may administer different virtual domains, an embodiment of the inventive system provides for at least one user account in the firewall system with the privilege to add or delete virtual domains. When a virtual domain is added or deleted, all interested applications, such as daemons 305 and 306 in the inventive firewall system (with sufficient privileges), are sent a notification message to notify them of the event. In response to the notification, such applications can then take whatever action is necessary (e.g. add a handler for the new virtual domain or clean up the obsolete virtual domain's state). When a configuration for an existing virtual domain stored in the database 313 is modified, a similar notification message is also sent to inform interested applications about the change. As it would appreciated by those of skill in the art, because virtual domain may be administered separately, it is desirable that a configuration change in one virtual domain not cause a global action such as a reboot.

A log server 308 may aggregate log messages from multiple daemons 305 and 306 servicing multiple virtual domains 226 and 227. Each log message 310 and 312 received from the applications 305 and 306 may either be classified as global, or it may contain an attribute to specify which virtual domain it pertains to. In an embodiment of the invention, the action performed by the log server 308 on each log message (e.g. discarding, storing locally, forwarding to an external server) may be different for each log type as well. In an embodiment of the invention, for future convenience in archiving and storing the logs, log messages pertaining to each virtual domain are stored in separate files. In another embodiment, separate files are utilized to store different categories of logs. Because the number of active log files and sockets may exceed the limit of the operating system, an embodiment of the logging server 308 keeps a table of open file descriptors for each active log file, and closes the file descriptors of inactive log files, as dictated by an Least Recently Used (LRU) algorithm, well known to persons of skill in the art. Specifically, in accordance with the aforementioned LRU algorithm, the embodiment of the inventive system closes the least recently used descriptors first. To this end, the system uses the aforementioned file descriptor table to keep track of which log files were used as well as when the last use took place. In another embodiment, a Pseudo-LRU algorithm is utilized, which employs a probabilistic scheme that almost always discards one of the least recently used items.

In an embodiment of the inventive concept, daemon processes 305 and 306, which handle content filtering and/or anti-malware services for multiple virtual domains aggregate all of their virtual-domain associated internal variables into a structure known as a virtual domain state. A daemon process 305 or 306 may create and manage multiple instances of such structure, each corresponding to a different virtual domain.

A global reference (or pointer) variable for each daemon process 305 and 306 is set to point to the instance of the aforesaid virtual domain state data structure corresponding to the presently active virtual domain. Each entry point into the daemon service process, such as modules that read data from a socket, event notification handlers, signal handlers, etc., update this pointer to the current virtual domain based on an attribute in the received message. Alternatively, the information on the currently active virtual domain may be derived from the message itself, as was described above. For example, in the case of socket descriptors, the daemon process may lookup the identity of the associated virtual domain based on the value of the socket_id variable associated with the socket.

For added fault tolerance, the daemon process may optionally reset the described current virtual domain reference variable at each exit point. In an embodiment of the daemon module, various functions can access any variables pertaining to an active virtual domain as if they were global variables by using an indirect reference via the aforesaid current virtual domain reference variable. Additionally, the daemon module may provide a set of callback functions to handle creation of a new virtual domain state in response to a virtual domain addition message, removing of a virtual domain state in response to a deletion message, and modification a virtual domain state in response to a configuration change.

In an embodiment of the inventive firewall system, some daemon processes may act as server processes, forking child processes to handle specific incoming connections. In certain well-known protocols (e.g. PPTP, L2TP, or HTTP), the child process may even fork further processes. In an embodiment of the inventive technique, in order to reduce process overhead on the system, it may be advantageous to aggregate not just the server processes for the virtual domains, but the child processes as well. This is achieved with the use of extra notification messages from the parent process to the child process. When a new session is created, rather than forking a new child process, the parent process may allocate that session to an already existent child. Specifically, the parent encapsulates all initial state parameters into a message that is sent to the child. The child then creates a session state structure, which is analogous to the aforementioned virtual domain state, and processing of multiple simultaneous sessions is accomplished in a described manner. It is not necessary that all sessions from a single virtual domain be allocated to the same child process; however there may often be a performance advantage to doing so. In order to properly distribute the connections among child processes, in one embodiment of the invention, the parent process receives a notification when a session is disconnected, which allows the parent process to track the number of open sessions for each of its children.

The inventive firewall system may also comprise functionality for handling network content not associated with any of the managed virtual domains. Such out-of-band content includes communications between multiple nodes in a high availability (HA) cluster, communications with network-enabled off-board hardware such as a server chassis management system, or connections from a terminal server. In most cases, traffic from these networks should be kept separate from other network traffic. To avoid mixing the out-of-band traffic with the filtered network content, while still permitting routing, in one embodiment of the invention, a separate virtual domain is provided to contain the out-of-band management traffic.

Figure 5:
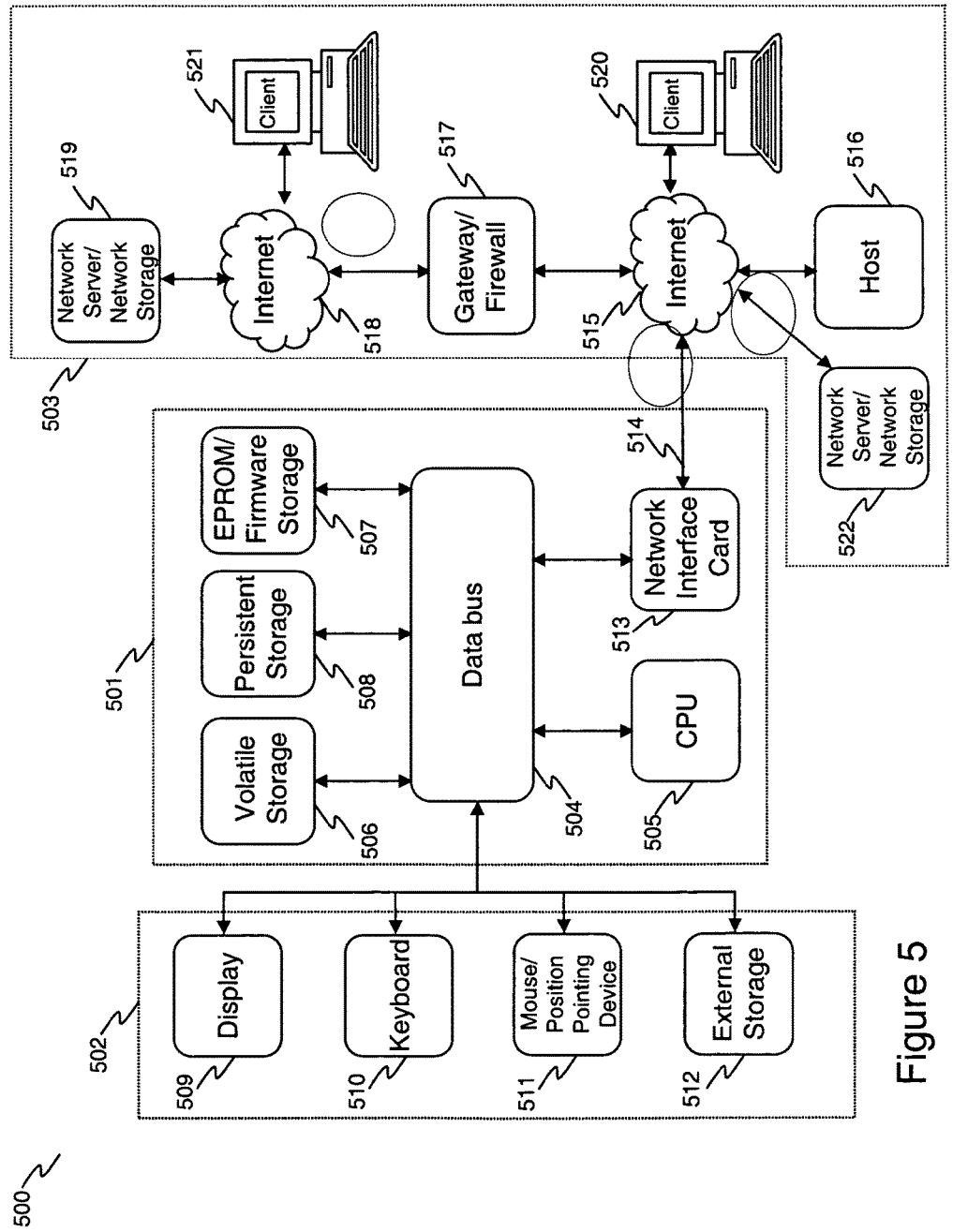
FIG. 5 illustrates an exemplary computer platform upon which the inventive content processing system may be implemented.

FIG. 5 is a block diagram that illustrates an embodiment of a computer/server system 500 upon which an embodiment of the inventive methodology may be implemented. The system 500 includes a computer/server platform 501, peripheral devices 502 and network resources 503.

The computer platform 501 may include a data bus 504 or other communication mechanism for communicating information across and among various parts of the computer platform 501, and a processor 505 coupled with bus 501 for processing information and performing other computational and control tasks. Computer platform 501 also includes a volatile storage 506, such as a random access memory (RAM) or other dynamic storage device, coupled to bus 504 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 504 to a display 509, such as a cathode ray tube (CRT), plasma display, or a liquid crystal display (LCD), for displaying information to a system administrator or user of the computer platform 501. An input device 510, including alphanumeric and other keys, is coupled to bus 501 for communicating information and command selections to processor 505. Another type of user input device is cursor control device 511, such as a mouse, a trackball, or cursor direction keys for communicating direction information and command selections to processor 504 and for controlling cursor movement on display 509. This input device typically has two degrees of freedom in two axes, a first axis (e.g., x) and a second axis (e.g., y), that allows the device to specify positions in a plane.

An external storage device 512 may be connected to the computer platform 501 via bus 504 to provide an extra or removable storage capacity for the computer platform 501. In an embodiment of the computer system 500, the external removable storage device 512 may be used to facilitate exchange of data with other computer systems.

Embodiments of the present invention are related to the use of computer system 500 for implementing the techniques described herein. In an embodiment, the inventive content processing systems 300 and 400 may reside on a machine such as computer platform 501. In an embodiment, database 313 may be deployed on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 508. Volatile media includes dynamic memory, such as volatile storage 506. Transmission media includes coaxial cables, copper wire and fiber optics, including the wires that comprise data bus 504. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is connected to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 513 typically provides data communication through one or more networks to other network resources. For example, network link 514 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 514 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution. In this manner, computer system 501 may obtain application code in the form of a carrier wave.

It should be noted that the present invention is not limited to any specific firewall system. The inventive policy-based content processing system may be used in any firewall operating modes, including, without limitation, Network Address Translation (NAT), routed and transparent modes.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized network content processing system. It is intended that the specification and examples be considered as exemplary only, with a true scope and spirit of the invention being indicated by the following claims.

What is claimed is:

1. A method comprising:
    initiating a service daemon process within a firewall coupled to a plurality of virtual domains, wherein the service daemon process handles content processing of network traffic for all of the plurality of virtual domains by aggregating communication channels associated with the plurality of virtual domains and by applying to the network traffic an appropriate content processing policy corresponding to a virtual domain of the plurality of virtual domains with which the network traffic is associated;
    receiving, by the firewall, a first connection request involving a first virtual domain of the plurality of virtual domains;
    forking, by the service daemon process, a first child process for handling network traffic associated with the first virtual domain;
    establishing a first communication channel for the first virtual domain between a kernel of the firewall and the service daemon process to transfer at least a portion of the network traffic associated with the first virtual domain between the service daemon process and the kernel;
    configuring the first child process to perform content processing in accordance with a first content processing policy of the first virtual domain; and
    performing, by the first child process, content processing of the network traffic associated with the first virtual domain based on the first content processing policy.

2. The method of claim 1, further comprising:
    receiving, by the firewall, a second connection request involving a second virtual domain of the plurality of virtual domains;

forking, by the service daemon process, a second child process for handling network traffic associated with the second virtual domain;
transferring at least a portion of network traffic associated with the second virtual domain between the service daemon process and the kernel;
configuring the second child process to perform content processing in accordance with a second content processing policy of the second virtual domain; and
performing, by the second child process, content processing of the network traffic associated with the second virtual domain based on the second content processing policy.

3. The method of claim 2, wherein the first connection request and the second connection request comprise requests for creating a new session.

4. The method of claim 1, wherein said configuring the first child process to perform content processing in accordance with a first content processing policy of the first virtual domain comprises:
encapsulating initial state parameters into an extra notification message when a new session is created;
sending the extra notification message from the service daemon process to the first child process;
creating, by the first child process, a session state structure, which is analogous to the state of the first virtual domain.

5. The method of claim 1, wherein a plurality of child processes are created by the service daemon process.

6. The method of claim 5, wherein sessions from a common virtual domain of the plurality of virtual domains are allocated to a common child process of the plurality of child processes by the service daemon process.

7. The method of claim 5, wherein sessions from a common virtual domain are allocated to different child processes of the plurality of child processes by the service daemon process.

8. The method of claim 5, further comprising:
receiving, by the service daemon process, a notification when a connection is disconnected; and
tracking, by the service daemon process, a number of connections for each of the plurality of child processes.

9. A non-transitory computer-readable medium tangibly embodying one or more sequences of instructions, which when executed by one or more processors of a firewall, coupled to a plurality of virtual domains, cause the one or more processors to perform a method comprising:
initiating a service daemon process within the firewall, wherein the service daemon process handles content processing of network traffic for all of the plurality of virtual domains by aggregating communication channels associated with the plurality of virtual domains and by applying to the network traffic an appropriate content processing policy corresponding to a virtual domain of the plurality of virtual domains with which the network traffic is associated;
forking, by the service daemon process, a child process for handling network traffic for a virtual domain;
receiving, by the firewall, a first connection request involving a first virtual domain of the plurality of virtual domains;
establishing a first communication channel for the virtual domain between a kernel of the firewall and the service daemon process to transfer at least a portion of a first network traffic for the virtual domain between the service daemon process and the kernel;
configuring the child process to perform content processing in accordance with a content processing policy of the virtual domain;
performing, by the child process, content processing of the first network traffic for the virtual domain based on the content processing policy;
receiving, by the firewall, a second connection request involving a virtual domain of the plurality of virtual domains;
transferring at least a portion of a second network traffic for the virtual domain between the service daemon process and the kernel;
allocating the second network traffic of the virtual domain to the child process; and
performing, by the child process, content processing of the second network traffic.

10. The computer-readable medium of claim 9, wherein the first connection request and the second connection request comprise requests for creating a new session.

11. The computer-readable medium of claim 10, wherein the configuring comprises:
encapsulating initial state parameters into a extra notification message when a new session is created;
sending the extra notification message from the service daemon process to the child process;
creating, by the child process, a session state structure, which is analogous to the state of the virtual domain.

12. The computer-readable medium of claim 9, wherein a plurality of child processes are created by the service daemon process.

13. The computer-readable medium of claim 12, wherein sessions from the same virtual domain are allocated to the same child process of the plurality of child processes by the service daemon process.

14. The computer-readable medium of claim 12, wherein sessions from a single virtual domain are allocated to different child processes by the service daemon process.

15. The computer-readable medium of claim 9, wherein the method further comprises:
receiving, by the service daemon process, a notification when a connection is disconnected; and
tracking, by the service daemon process, the number of connections for each of the child processes.

16. The computer-readable medium of claim 9, wherein the second network traffic is from the first virtual domain.

17. The computer-readable medium of claim 9, wherein the second network traffic is from a second virtual domain and the method further comprises:
establishing a second communication channel for the second virtual domain between a kernel of the firewall and the service daemon process to transfer at least a portion of a second network traffic for the second virtual domain between the service daemon process and the kernel;
configuring the child process to perform content processing in accordance with a content processing policy of the second virtual domain;
performing, by the child process, content processing of the second network traffic for the second virtual domain based on the content processing policy.

18. A method comprising:
initiating a service daemon process within a firewall coupled to a plurality of virtual domains, wherein the service daemon process handles content processing of network traffic for all of the plurality of virtual domains by aggregating communication channels associated with the plurality of virtual domains and by applying to the network traffic an appropriate content processing policy corresponding to a virtual domain of the plurality of virtual domains with which the network traffic is associated;

receiving, by the firewall, a first connection request involving a first virtual domain of the plurality of virtual domains;

establishing a first communication channel for the virtual domain between a kernel of the firewall and the service daemon process to transfer at least a portion of a first network traffic for the virtual domain between the service daemon process and the kernel;

forking, by the service daemon process, a child process for handling the first network traffic;

configuring the child process to perform content processing in accordance with a content processing policy of the virtual domain;

performing, by the child process, content processing of the first network traffic for the virtual domain based on the content processing policy;

receiving, by the firewall, a second connection request involving a virtual domain of the plurality of virtual domains;

transferring at least a portion of a second network traffic for the virtual domain between the service daemon process and the kernel;

allocating the second network traffic of the virtual domain to the child process; and performing, by the child process, content processing of the second network traffic.

19. The method of claim 18, wherein the first connection request and the second connection request comprise requests for creating a new session.

20. The method of claim 19, wherein the configuring comprises:

encapsulating initial state parameters into a extra notification message when a new session is created;

sending the extra notification message from the service daemon process to the child process;

creating, by the child process, a session state structure, which is analogous to the state of the virtual domain.

21. The method of claim 18, wherein a plurality of child processes are created by the service daemon process.

22. The method of claim 21, wherein sessions from the same virtual domain are allocated to the same child process of the plurality of child processes by the service daemon process.

23. The method of claim 21, wherein sessions from a single virtual domain are allocated to different child processes by the service daemon process.

24. The method of claim 18, further comprising:

receiving, by the service daemon process, a notification when a connection is disconnected; and tracking, by the service daemon process, the number of connections for each of the child processes.

25. The method of claim 18, wherein the second network traffic is from the first virtual domain.

26. The method of claim 18, wherein the second network traffic is from a second virtual domain and the method further comprises:

establishing a second communication channel for the second virtual domain between a kernel of the firewall and the service daemon process to transfer at least a portion of a second network traffic for the second virtual domain between the service daemon process and the kernel;

configuring the child process to perform content processing in accordance with a content processing policy of the second virtual domain;

performing, by the child process, content processing of the second network traffic for the second virtual domain based on the content processing policy.

27. A non-transitory computer-readable medium tangibly embodying one or more sequences of instructions, which when executed by one or more processors of a firewall, coupled to a plurality of virtual domains, cause the one or more processors to perform a method comprising:

initiating a service daemon process within the firewall, wherein the service daemon process handles content processing of network traffic for all of the plurality of virtual domains by aggregating communication channels associated with the plurality of virtual domains and by applying to the network traffic an appropriate content processing policy corresponding to a virtual domain of the plurality of virtual domains with which the network traffic is associated;

receiving, by the firewall, a first connection request involving a first virtual domain of the plurality of virtual domains;

establishing a first communication channel for the virtual domain between a kernel of the firewall and the service daemon process to transfer at least a portion of a first network traffic for the virtual domain between the service daemon process and the kernel;

forking, by the service daemon process, a child process for handling the first network traffic;

configuring the child process to perform content processing in accordance with a content processing policy of the virtual domain;

performing, by the child process, content processing of the first network traffic for the virtual domain based on the content processing policy;

receiving, by the firewall, a second connection request involving a virtual domain of the plurality of virtual domains;

transferring at least a portion of a second network traffic for the virtual domain between the service daemon process and the kernel;

allocating the second network traffic of the virtual domain to the child process; and performing, by the child process, content processing of the second network traffic.

28. The computer-readable medium of claim 27, wherein the first connection request and the second connection request comprise requests for creating a new session.

29. The computer-readable medium of claim 28, wherein the configuring comprises:

encapsulating initial state parameters into a extra notification message when a new session is created;

sending the extra notification message from the service daemon process to the child process;

creating, by the child process, a session state structure, which is analogous to the state of the virtual domain.

30. The computer-readable medium of claim 27, wherein a plurality of child processes are created by the service daemon process.

31. The computer-readable medium of claim 30, wherein sessions from the same virtual domain are allocated to the same child process of the plurality of child processes by the service daemon process.

32. The computer-readable medium of claim 30, wherein sessions from a single virtual domain are allocated to different child processes by the service daemon process.

33. The computer-readable medium of claim 27, wherein the method further comprises:
- receiving, by the service daemon process, a notification when a connection is disconnected; and
- tracking, by the service daemon process, the number of connections for each of the child processes.

34. The computer-readable medium of claim 27, wherein the second network traffic is from the first virtual domain.

35. The computer-readable medium of claim 28, wherein the second network traffic is from a second virtual domain; and the method further comprising:
- establishing a second communication channel for the second virtual domain between a kernel of the firewall and the service daemon process to transfer at least a portion of a second network traffic for the second virtual domain between the service daemon process and the kernel;
- configuring the child process to perform content processing in accordance with a content processing policy of the second virtual domain;
- performing, by the child process, content processing of the second network traffic for the second virtual domain based on the content processing policy.

* * * * *